United States Patent Office 3,789,037
Patented Jan. 29, 1974

3,789,037
THERMOSETTING COATING COMPOSITION OF AN ALKYD RESIN MIXTURE AND ALIPHATIC POLYISOCYANATE CROSS-LINKING AGENT
Lester I. Miller, Flint, Mich., assignor to E. I. du Pont de Nemours and Company, Wilmington, Del.
No Drawing. Continuation-in-part of application Ser. No. 157,665, June 28, 1971. This application Dec. 10, 1971, Ser. No. 206,939
Int. Cl. C08g 39/10
U.S. Cl. 260—16      4 Claims

ABSTRACT OF THE DISCLOSURE

The coating composition of this invention contains as the film-forming binder an alkyd resin or a blend of alkyd resins and a polyisocyanate; this composition cures rapidly at ambient temperatures to a tough, durable, scratch resistant finish and is useful as an automotive and an appliance finish and as an automotive and truck repair finish.

CROSS REFERENCE TO RELATED APPLICATIONS

This application is a continuation-in-part of my co-pending application Ser. No. 157,665 filed June 28, 1971 now abandoned.

BACKGROUND OF THE INVENTION

This invention relates to a coating composition of an alkyd resin and a polyisocyanate cross-linking agent.

Alkyd resins have been widely used as the film-forming binders in coating compositions as shown in Moffett et al. U.S. Pat. 3,102,866, issued Sept. 3, 1963 and Haubert U.S. 3,228,787, issued Jan. 11, 1966. These coating compositions form excellent finishes but do not cure to a hard, tough, durable finish at a rapid rate which is required particularly in the repair of autobodies or truck bodies. Polyisocyanates have been used as cross-linking agents in coating compositions as is shown in Sekmakas U.S. Pat. 3,457,324, issued July 22, 1969 and Bearden U.S. 3,404,107, issued Oct. 1, 1968. But a composition is not provided that cures rapidly at ambient temperatures and gives a finish that has the physical properties currently required by industry.

The novel composition of this invention utilizes an alkyd resin in combination with a specific polyisocyanate to provide a high quality finish which cures rapidly at application temperatures.

SUMMARY OF THE INVENTION

The novel thermosetting coating composition of this invention comprises 10–60% by weight of a film-forming binder and an organic solvent for the binder in which the binder consists essentially of (1) 75–98% by weight of an alkyd resin consisting essentially of 30–70% by weight, based on the weight of the alkyd resin, of a drying oil that is either tung oil, tall oil, linseed oil, dehydrated castor oil, soya oil, chinawood oil or mixtures thereof; 30–55% by weight, based on the weight of the alkyd resin, of an ester of an organic dicarboxylic acid constituent and a polyol, up to 10% by weight, based on the weight of the alkyd resin, of an ester of an aromatic mono-carboxylic acid and a polyol, and up to 8% by weight, based on the weight of the alkyd resin of a polyol;
wherein the organic dicarboxylic acid constituent is either maleic acid, maleic anhydride, phthalic acid, phthalic anhydride, isophthalic acid, terephthalic acid, succinic acid, glutaric acid, adipic acid, pimelic acid, suberic acid, azelaic acid, sebacic acid or mixtures thereof;
wherein the polyol is either glycerol, ethylene glycol, propylene glycol, diethylene glycol, butane diol, trimethylol propane, trimethylol ethane, pentaerythritol, sorbitol, mannitol or mixtures thereof; and correspondingly, (2) 2–25% by weight of a polyisocyanate of the formula

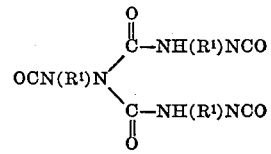

wherein $R^1$ is a divalent aliphatic hydrocarbon radical having 1–12 carbon atoms.

DESCRIPTION OF THE INVENTION

The novel coating composition of this invention has a binder solids content of 10–60% by weight, but preferably, 30–50% by weight of binder is used. The novel composition can be used as a clear or the composition can contain pigment in a pigment to binder ratio of 1:100 to about 200:100.

Preferably, a solution of the alkyd resin is slowly added to and blended with a solution of the polyisocyanate a short time before the composition is used. This prevents premature cross-linking of the composition before use. If the composition is pigmented, the pigments are dispersed in the alkyd resin solution by conventional techniques, such as sand grinding, ball milling and the like. After the alkyd resin solution and the polyisocyanate solution are blended together, the composition may be further reduced with conventional solvents and thinners to achieve the desired application viscosity.

The binder of the novel composition comprises about 75–98% by weight of the alkyd resin with about 2–25% by weight of a polyisocyanate. Preferably, the binder comprises 85–97% by weight of the alkyd resin and 3–15% by weight of the polyisocyanate.

The alkyd resin used in the novel coating composition of this invention is of a drying oil, an ester of an organic dicarboxylic acid constituent and a polyol and can contain up to 10% by weight of an ester of an aromatic monocarboxylic acid and a polyol and can contain up to 8% by weight of excess polyol. Preferably, the alkyd resin contains 35–65% by weight of a drying oil, 32–50% by weight of an ester of a polyol and an aromatic dicarboxylic acid, 2–9% by weight of an ester of an aromatic mono-carboxylic acid and a polyol and 2–5% by weight of excess polyol.

The alkyd resin is prepared by conventional techniques in which the constituents are charged into a reaction vessel along with an esterification catalyst and, preferably, a solvent, and heated to about 80–200° C. for about 0.5–6 hours. Water is removed as the constituents are esterified. The resulting alkyd resin should have an acid number less than 30, and preferably, less than 15.

The following drying oils are used to prepare the alkyd resin: tung oil, tall oil, linseed oil, dehydrated castor oil, soya oil, chinawood oil and mixtures of these drying oils.

Any of the following acids or anhydrides or mixtures thereof are used to prepare the alkyd resin: maleic acid, maleic anhydride, phthalic acid, phthalic anhydride, isophthalic acid, terephthalic acid, succinic acid, glutaric acid, adipic acid, pimelic acid, suberic acid, azelaic acid and sebacic acid.

The polyol used to prepare the alkyd resin is one of the following: glycerol, ethylene glycol, propylene glycol, diethylene glycol, butane diol, trimethylol propane, trimethylol ethane, pentaerythritol, sorbitol, mannitol or mixtures of these polyols.

The following aromatic mono-carboxylic acids can be used to prepare the alkyd resin: benzoic acid, paratertiary butylbenzoic acid, phenol acetic acid, triethyl benzoic acid and the like.

The following are preferred alkyd resins used in the novel composition of this invention:

an alkyd resin of 25–50% by weight of linseed oil, 10–20% by weight of chinawood oil, 35–45% by weight of glycerol phthalate, 4–8% by weight of glycerol isophthalate, and 2–5% by weight of glycerine;

an alkyd resin of 35–55% by weight of soya oil, 35–50% by weight of pentaerythritol phthalate, 5–10% by weight of pentaerythritol butyl benzoate, and 2–6% by weight of pentaerythritol;

mixtures of the above alkyd resins can be used to form a high quality composition.

The polyisocyanate used in this invention has the formula:

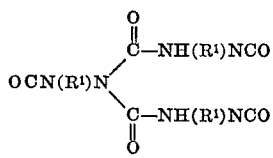

wherein $R^1$ is an alkyl group having 1–12 carbon atoms. One preferred polyisocyanate is the biuret of hexamethylene diisocyanate that has the above structural formula in which $R^1$ is a saturated straight chain hydrocarbon group having 6 carbon atoms. These biurets are prepared according to the process described in Mayer et al. U.S. Pat. 3,245,941, issued Apr. 12, 1966.

The polyisocyanate can be blended or reacted with a monohydric alcohol to provide a coating composition that has excellent hardness, gloss and image definition and in general a good appearance. The polyisocyanate can be cold blended with the monohydric alcohol and *a solvent* and then the mixture is added to the alkyd resin or the polyisocyanate can be reacted with the monohydric alcohol preferably at 80–100° C. for about 15–60 minutes and then added to the alkyd resin to form the novel coating composition of this invention.

The polyisocyanate should have a sufficient number of isocyanate groups available for cross linking with the alkyd resin. Preferably one equivalent of the monohydric alcohol is used with 12 equivalents of the polyisocyanate. In another useful composition one equivalent of the monohydric alcohol is used with 3 equivalents of the polyisocyanate.

Typical monohydric alcohols containing 4–20 carbon atoms can be used such as butanol, isobutanol, hexanol, octanol, 2-ethyl hexanol, nonyl alcohol, lauryl alcohol, dodecanol and the like. Preferred are 8–12 carbon atom monohydric alcohols.

A catalyst of an alkyl tin dilaurate such as dibutyl tin dilaurate can be added to the above polyisocyanate solution.

The novel composition generally is pigmented, and preferably, contains pigments in a pigment to binder ratio of 2:100 to about 150:100. Examples of the great variety of pigments which are used in the novel coating composition of this invention are metallic oxides, preferably titanium dioxide, zinc oxide, and the like, metal hydroxides, metal flakes, metal powders, chromates, such as lead chromate, sulfides, sulfates, carbonates, carbon black, silica, talc, china clay, iron blues, organic reds, maroons, organic dyes, lakes, and the like.

To increase the rate of cure of the novel composition, it is preferred to add about 0.1–3% by weight, based on the weight of the binder, of a metallic drier. Typical driers that are used are, for example, nickel naphthenate, dibutyl tin dilaurate, cobalt naphthenate, manganese naphthenate, lead tallate; metal salts of a 6–12 carbon atom saturated aliphatic monocarboxylic acid, such as nickel octoate, cobalt octoate, nickel caprylate, nickel-2-ethylhexoate and the like.

Plasticizers can be used in the novel coating composition of this invention in amounts up to 10% by weight of the binder. Polymeric plasticizers which can be used are epoxidized soya bean oil, oil free and oil modified alkyds and polyesters, such as polyorthophthalate esters, polyalkylene adipate esters or polyarylene adipate esters. Monomeric plasticizers that can be used are butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl) phthalate.

One to 20% by weight, based on the weight of the binder, of cellulose acetate butyrate can be used in the novel coating composition. The cellulose acetate butyrate preferably has a butyryl content of about 45–55% by weight and a viscosity of 0.1–6 seconds determined at 25° C. according to ASTM-D-1343-56.

The novel composition of this invention can be used as a primary topcoat on automobiles and trucks or as a repair coat for damaged finishes. The composition can be diluted to an application viscosity with any of the conventional solvents and thinners and can be applied by conventional techniques, such as brushing, spraying, electrostatic spraying, flow coating, dip coating, roller coating and the like. By choosing the desirable solvents and by varying the ratio of the solvents, the novel composition can be provided with the physical properties required for the aforementioned application methods. The resulting finish is then air dried or can be force dried at about 100–150° C. The novel composition can be applied over primers, sealers and ground coats conventionally used on automobiles and trucks or may be applied directly over a sanded damaged paint to repair the finish.

The following example illustrates the invention. The parts and percentages are on a weight basis unless otherwise specified.

Example 1

A mill base is prepared as follows:

| | Parts by weight |
|---|---|
| Titanium dioxide pigments | 631.0 |
| Soya alkyd resin solution (55% solids in xylene of 43% soya bean oil/52% glycerol phthalate/ 5% excess glycerine) | 151.2 |
| Aromatic hydrocarbon solvent (50/50 blend of xylene/hydrocarbon solvent having a boiling point of 150–190° C. and an aniline point of −28° C.) | 217.8 |
| Total | 1,000.0 |

The above ingredients are thoroughly blended together and charged into a conventional sand mill and ground to a 0.2 mil fineness.

A coating composition is then formed by blending the following ingredients:

| | Parts by weight |
|---|---|
| Linseed oil alkyl resin solution (50% solids in hydrocarbon solvent of 35.0% linseed oil, 15.0% chinawood oil, 41% glycerol phthalate, 6% glycerol isophthalate, 3% excess glycerine) | 327.05 |
| Soya oil alkyd resin solution (50% solids in hydrocarbon solvent of 48% soya oil, 9% pentaerythritol butyl benzoate, 39% pentaethythritol phthalate and 4% excess pentaerythritol) | 148.84 |
| Mill base (prepared above) | 205.05 |
| Melamine formaldehyde solution (55.5% solids in butyl alcohol) | 9.60 |
| Cobalt naphthenate drier solution (6% cobalt in hydrocarbon solvent) | 3.15 |
| Managanese naphthenate drier solution (6% magnanese in hydrocarbon solvent) | 0.49 |
| Lead tallate drier solution (68% lead tallate in hydrocarbon solvent, 24% lead) | 5.22 |
| Hydrocarbon solvent (boiling point 150–190° C. aniline point −28° C.) | 44.94 |
| V.M. & P. naphtha | 94.58 |
| Total | 838.92 |

The above ingredients are thoroughly blended together to form an enamel paint.

An isocyanate solution is then prepared by blending the following ingredients:

| | Parts by weight |
|---|---|
| Toluene and V.M. & P. naphtha solution (50:50 blend) | 100.0 |
| Acetone | 21.8 |
| "Desmodur N" solution (75% solids solution of the biuret of hexamethylene diisocyanate in a 50:50 xylene/Cellosolve acetate solvent) | 13.2 |
| Total | 135.0 |

A finish is then prepared by blending the following ingredients:

| | Parts by weight |
|---|---|
| Enamel paint (prepared above) | 100 |
| Isocyanate solution (prepared above) | 30 |
| Total | 130 |

The above ingredients are thoroughly blended together and then sprayed onto a steel panel primed with 1 mil of an alkyd resin primer pigmented with iron oxide and having a 0.5 mil thick coating of black dip alkyd resin primer over the iron oxide primer. The coating is allowed to air dry. The resulting dried coating is about 2 mils thick, has an excellent appearance, good smoothness and gloss and a good image definition. The coating has excellent chip resistance and excellent weatherability.

Example 2

An isocyanate reaction product is prepared as follows:

| | Parts by weight |
|---|---|
| "Desmodur N" solution (described in Example 1) | 54.32 |
| 2-ethylhexyl alcohol | 9.23 |
| Toluene | 36.44 |
| Dibutyl tin dilaurate | 0.01 |
| Total | 100.00 |

The above ingredients are charged into a reaction vessel and heated to 85–95° C. for about 30 minutes while the ingredients are being agitated.

An isocyanate solution is prepared by blending the following ingredients:

| | Parts by weight |
|---|---|
| Isocyanate reaction product (prepared above) | 27.32 |
| Dibutyl tin dilaurate | 1.84 |
| Toluene | 46.33 |
| Total | 75.49 |

A finish is then prepared by blending the following ingredients:

| | Parts by weight |
|---|---|
| Enamel paint (prepared in Example 1) | 100 |
| Isocyanate solution (prepared above) | 25 |
| Total | 125 |

The above finish is diluted to a spray viscosity of about 20 seconds in a No. 2 Zahn cup at 25° C. with a conventional enamel reducer thinner of aromatic and aliphatic solvents. The finish is then sprayed onto a steel panel primed with about 1 mil of an alkyd resin primer pigmented with iron oxide and having a 0.5 mil thick coating of black dip alkyd resin primer over the iron oxide primer. The coating is allowed to air dry. The resulting dried coating is about 2 mils thick, has an excellent appearance, good smoothness and gloss and a good image definition. The coating has excellent chip resistance and excellent weatherability.

Example 3

An isocyanate solution is prepared by blending together the following ingredients:

| | Parts by weight |
|---|---|
| "Desmodur N" solution (described in Example 1) | 20.46 |
| Toluene | 76.14 |
| Dibutyl tin dilaurate | 2.44 |
| 2-ethylhexyl alcohol | 0.96 |
| Total | 100.00 |

A finish is then prepared by blending together the following ingredients:

| | Parts by volume |
|---|---|
| Enamel paint (prepared in Example 1) | 8 |
| Isocyanate solution (prepared above) | 1 |
| Conventional enamel reducer thinner (mixture of aromatic and aliphatic solvents) | 2 |
| Total | 11 |

The finish is then sprayed onto a steel panel primed with about 1 mil of an alkyd resin primer pigmented with iron oxide and having a 0.5 mil thick coating of a black dip alkyd resin primer over the iron oxide primer. The coating is allowed to air dry. The resulting dried coating is about 2 mils thick, has good gloss and hardness, excellent smoothness, good image definition and has an excellent overall appearance. The coating also exhibits excellent chip resistance and excellent weatherability.

I claim:
1. A thermosetting coating composition comprising 10–60% by weight of a film-forming binder and an organic solvent for the binder and containing pigment in a pigment to binder ratio of 2:100 to 150:100; wherein the binder consists essentially of

(1) 85–97% by weight, based on the weight of the binder, of an alkyd resin blend of
(a) an alkyd resin of 25–50% by weight of linseed oil, 10–20% by weight of chinawood oil, 35–45% by weight of glycerol phthalate 4–8% by weight of glycerol isophthalate and 1–8% by weight of glycerine; and (b) an alkyd resin of 35–55% by weight of soya oil, 35–50% by weight of pentaerythritol phthalate and 5–10% by weight of pentaerythritol butyl benzoate and 1–8% by weight of pentaerythritol; and correspondingly, (2) 3–15% by weight, based on the weight of the binder, of a polyisocyanate of the formula

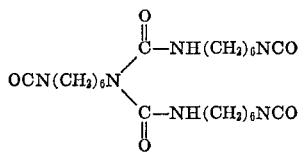

and contains 0.1–3% by weight based on the weight of the binder of a metal naphthenate and a lead tallate drier.

2. The coating composition of claim 1 in which the polyisocyanate is at least partially reacted with a monohydric alcohol having 8–12 carbon atoms and the composition contains an additional drier of dibutyl tin dilaurate.

3. The coating composition of claim 1 containing 1–20% by weight, based on the weight of the binder, of cellulose acetate butyrate having a viscosity of about 0.1–6 seconds measured at 25° C. according to ASTM–D–1343–56.

4. A metal sheet having a dried coalesced layer of the composition of claim 1.

References Cited

UNITED STATES PATENTS

| 3,316,189 | 4/1967 | Adams | 260—13 |
| 3,574,154 | 4/1971 | Shaw et al. | 260—16 |
| 3,244,673 | 4/1966 | Bruin | 260—22 TN |
| 3,437,615 | 4/1969 | Hanson | 260—22 CQ |

WILLIAM SHORT, Primary Examiner

F. WOODBERRY, Assistant Examiner

U.S. Cl. X.R.

117—74, 75, 132 A, B, 161 K, KP; 260—22 CQ, 22 TN, 40 R, TN